United States Patent Office 3,556,639
Patented Jan. 19, 1971

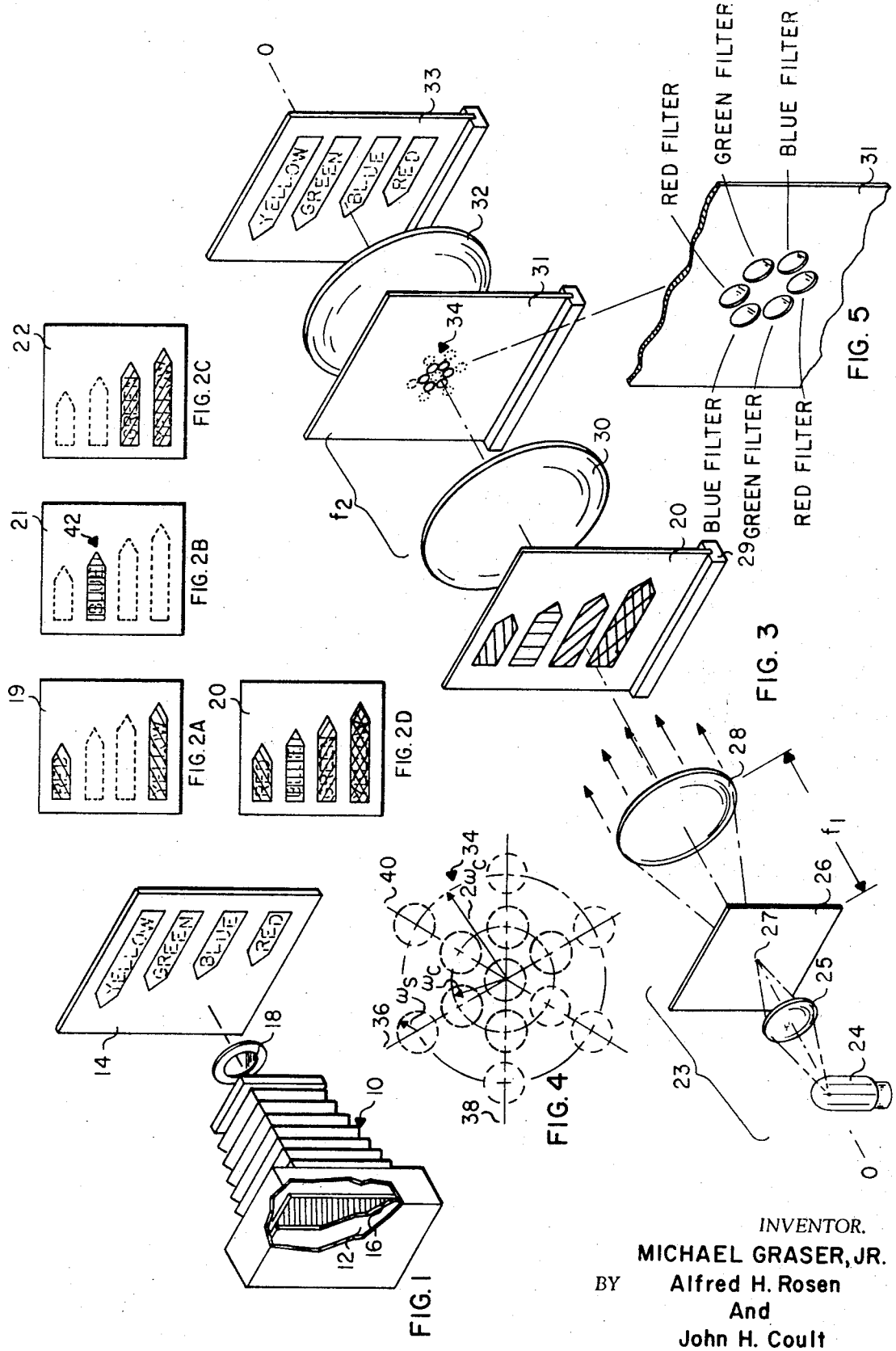

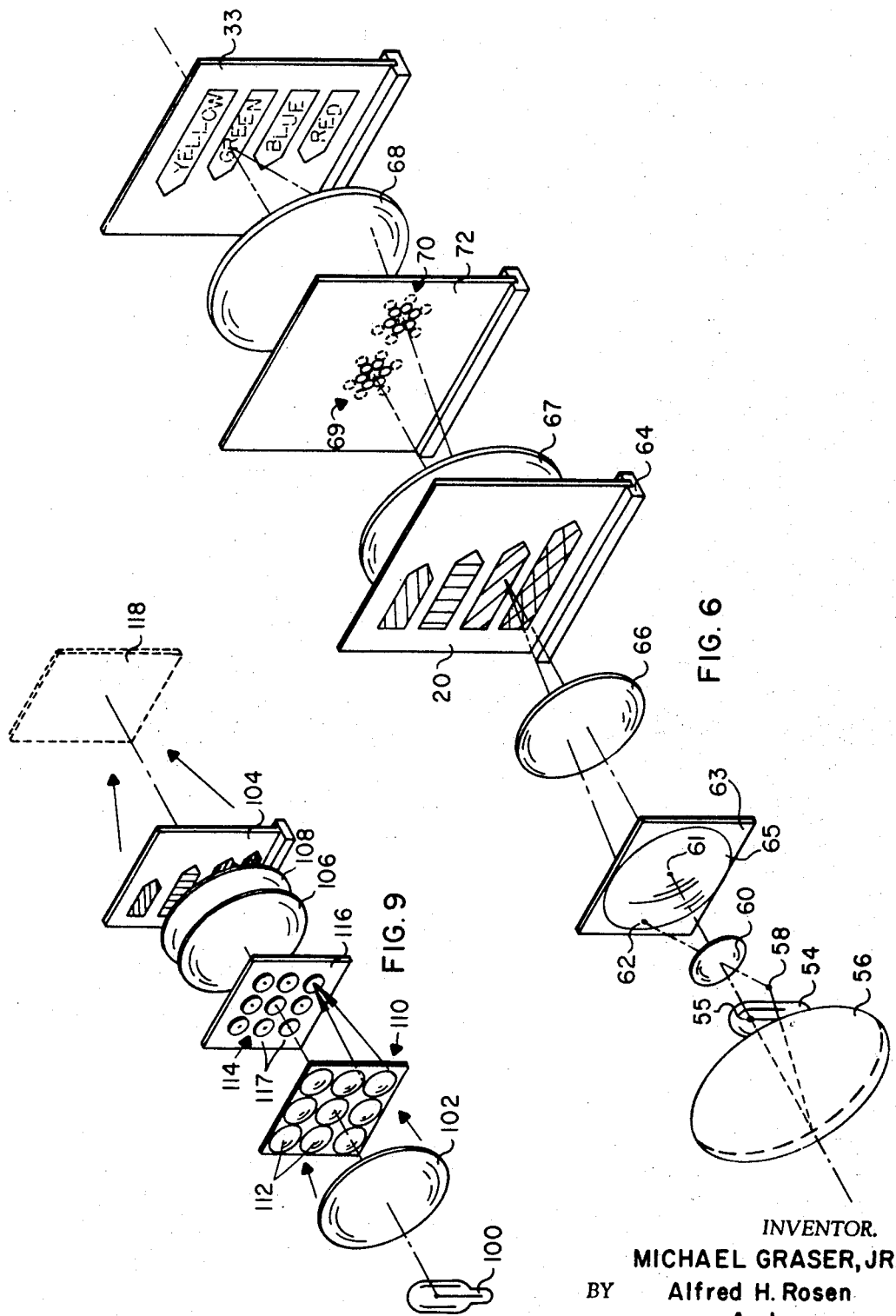

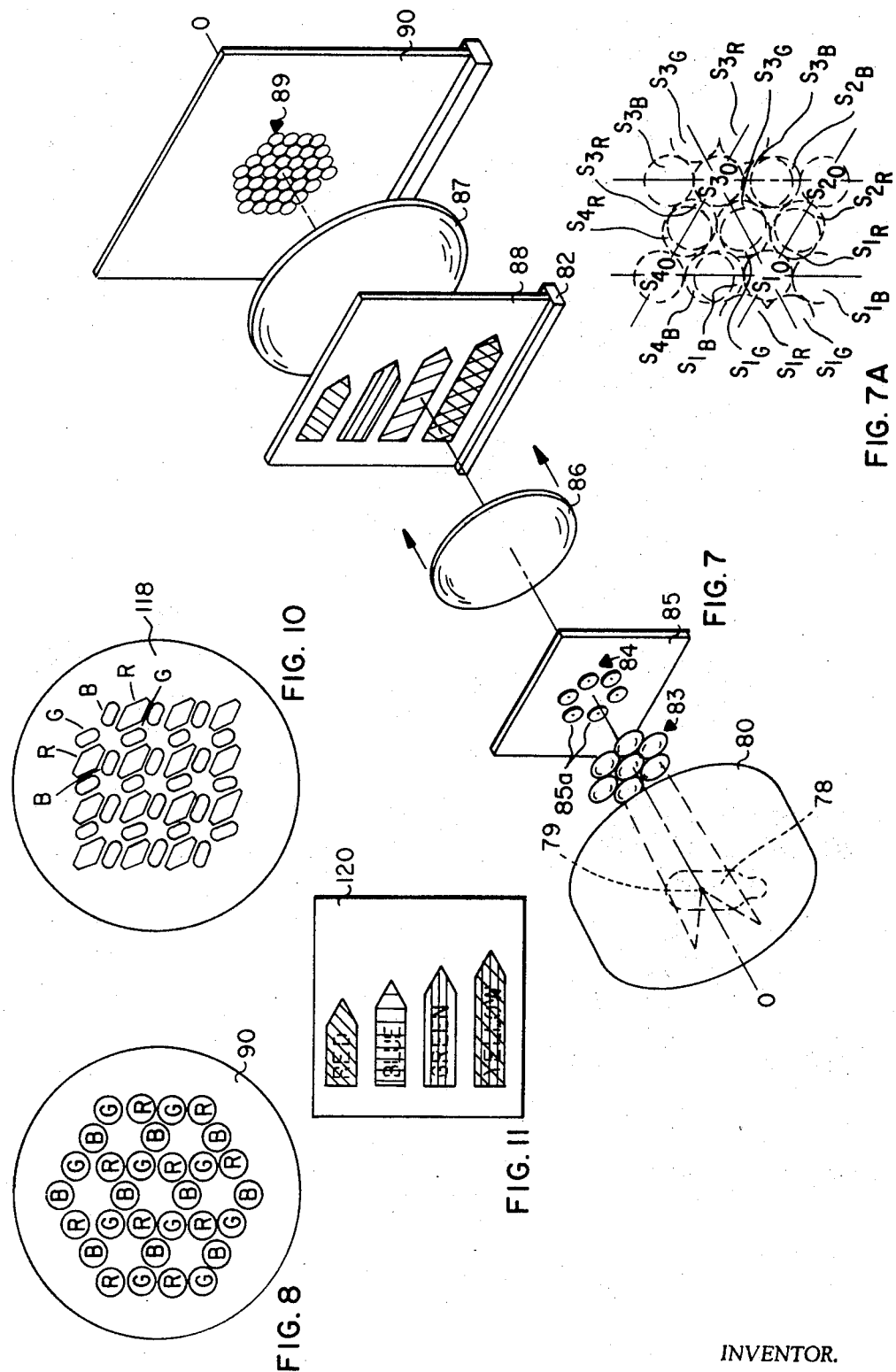

3,556,639
PLURAL SOURCE OPTICAL APPARATUS AND METHOD FOR DISPLAYING SPATIALLY PERIODICALLY MODULATED RECORDS
Michael Graser, Jr., Bedford, Mass., assignor to Technical Operations Incorporated, Burlington, Mass., a corporation of Delaware
Filed Nov. 7, 1967, Ser. No. 682,728
Int. Cl. G02b 27/38
U.S. Cl. 350—162     28 Claims

ABSTRACT OF THE DISCLOSURE

Apparatus and methods for recovering images which are stored on photographic records as modulations of azimuthally distinct spatial carriers. Stress is placed upon a novel arrangement for providing a plurality of sources and novel apparatus for spatially and spectrally filtering the plurality of information channels created so as to produce displays of maximum fidelity.

BACKGROUND OF THE INVENTION

This invention concerns apparatus for displaying records having a plurality of images recorded in self-registering overlapping relationship on the same element of storage material. Each of the images may represent a separate scene record upon which is impressed a distinct spatially periodic modulation. The images are selectively retrievable, one or more at a time, by the use of diffraction phenomena and spatial filtering in a Fourier transform space. By the uniqueness of the periodic modulation associated with each of the images, the respective diffraction patterns of the separate images are caused to be separated in the transform space. By appropriate spatial filtering in the transform space, the desired image or images may be displayed. The technique is extraordinarily adaptable to producing full color scene reproductions from a colorless photographic record. For example, if a colored scene is photographed in succession through red, green and blue spectral filters, and if while doing so, a spatially periodic modulation, e.g., the image of a grating, is multiplied with each of the images at respectively different azimuthal orientations, three self-registered records will be formed, each being associated with a distinct spectral zone and modulation orientation.

To reconstruct a full-color reproduction of the photographed scene with a colorless record produced as described, the record may be displayed with projection apparatus which causes, because of the effect of the spatial periodic modulations acting as diffraction gratings, a plurality of diffractions patterns to be formed. The respective patterns thus formed share a common zeroth order location, but are relatively angularly spaced in accordance with the relative angular orientations of the gratings during exposure. Each of the orders of each of the patterns contains a spectrum of spatial frequencies representing the scene spatial frequencies modulating a carrier representing a multiple of grating spatial frequency (the factor of multiplication being dependent upon the diffraction order). By appropriate spatial filtering with an apertured mask in the transform space, for example, with a mask designed so as to pass the first order components of each of the angularly separate patterns, and by appropriate spectral filtering of the mask apertures to correlate the spectral content of the light passed by each of the mask apertures with the spectral zone associated with the color separation image passed by that aperture, a full-color reconstruction of the original scene may be obtained.

Techniques of spectral zone photography have been known for some time. For example, in 1936 a technique involving associatting distinct periodic modulations with separate color separation records and utilizing spatial filtering for image retrieval was explained in a patent issued in the United States to Bocca, Pat. No. 2,050,117 (later reissued as resissue Pat. No. Re 20,748). It is significant to note that the described concept of spectral zonal photography has not been developed in spite of its early discovery and its considerable potential commercial value. One of the chief reasons, perhaps, for the lack of activity in pursuit of this concept is the difficulty encountered in attempts to display the records formed by such a technique. The problem lies in the necessity of utilizing Fraunhofer diffraction phenomena, which requires an effectively far field source at least partially coherent light. A source of at least partially coherent polychromatic light is normally obtained in the form of a brightly illuminated pinhole in an opaque mask.

In order to maximize the brightness of the displayed image, it is well known from conventional optical projection principles that the condenser optics should image the effective light source in or near the projection lens aperture. Because the projected image illuminance is a function of the product of the brightness of the projection lens aperture and the area thereof, it is evident that, even assuming an effective point source of optimum luminosity, the restricted area of the projection lens which is illuminated will limit the amount of luminous energy transmitted by the projection lens aperture, resulting in the production of low luminance, high-noise images.

OBJECTS OF THE INVENTION

Accordingly, it is an object of this invention to provide novel display apparatus and methods for displaying information stored optically on a spatially periodically modulated record, which apparatus and method is capable of producing much brighter displays than were obtainable previously.

It is an object to markedly increase the efficiency of display apparatus in the utilization of available source energy without decreasing the spatial coherence of the projection radiation.

It is another object to provide display apparatus capable of producing from colorless records relatively bright color displays without sacrificing color saturation.

It is yet another object of this invention to provide for use with such apparatus an improved spatial filter assisting in making possible the brighter displays.

Further objects and advantages of the invention will in part be obvious and will in part become apparent as the following description proceeds.

The features of novelty which characterize the invention will be pointed out with particularity in the claims annexed to and forming a part of this specification.

SUMMARY OF THE INVENTION

This invention concerns, as embodied in structure, novel light source ond spatial frequency filter means for use with apparatus for displaying spatially periodically modulated photographic records. The novel light source comprises means for providing a plurality of separated, effectively far field sources of at least partially coherent light for making possible the resolution in a Fourier transform space of a corresponding plurality of diffraction patterns of a spatially periodically modulated record illuminated by the plurality of light sources. The novel filter means includes spatial frequency filter means for location in said transform space and comprising mask means having a plurality of openings distributed thereon to pass at least one selected order of each of the said diffraction patterns.

3

BRIEF DESCRIPTION OF THE DRAWINGS

For a fuller understanding of the invention, reference may be had to the following detailed description taken in connection with the accompanying drawings wherein:

FIG. 1 is a distorted-scale schematic perspective view of a colored object and photographic camera which might be used for forming photographic records of the object; the view shows the camera partially broken away to reveal a photographic recording material and a diffraction grating which would be otherwise hidden within the interior of the camera;

FIGS. 2A–2D show individual and composite color separation records of the object being photographed, each of the individual records being associated with a particular zone of the visible spectrum and with a periodic modulation distinctive by its relative angular orientation;

FIG. 3 is a distorted-scale schematic perspective view of prior art projection display apparatus for displaying photographic records of the above-described type;

FIG. 4 is a front elevation view, schematic and grossly simplified for ease of understanding, of a Fraunhofer diffraction pattern which might be formed in a Fourier transform space in the apparatus of FIG. 3;

FIG. 5 is a schematic perspective view, enlarged and broken away, of a spatial filter shown in FIG. 3;

FIG. 6 is a distorted-scale schematic perspective view of a simplified form of projection display apparatus embodying the principles of this invention to provide increased brightness of the displayed images;

FIG. 7 is a schematic perspective view of a preferred embodiment of projection display apparatus which may be constructed in accordance with the teachings of this invention;

FIG. 7A is an enlarged schematic illustration of related diffraction spectra from different groups of diffraction patterns in overlapping relationship in accordance with the invention;

FIG. 8 depicts a front elevation view of a preferred form of a spatial filter which may be constructed in accordance with this invention for location in transform space in the projection apparatus of FIG. 7;

FIG. 9 is a schematic perspective view of a preferred embodiment of a portion of display apparatus which may be constructed to implement the teachings of the invention;

FIG. 10 is a front elevation view of a spatial filter for use with the FIG. 9 display apparatus; and FIG. 11 is a composite photographic record which might be displayed in the FIG. 10 apparatus.

DESCRIPTION OF THE PREFERRED EMBODIMENTS

As indicated above, the recovery of stored information from photographic records by diffraction phenomena and spatial filtering has been hampered by the low levels of illumination which can be delivered through the film gate to the display screen due to the requirement that the light source be at least partially coherent. The nature of this and other problems existing in prior art display apparatus will be more clearly understood in connection with the following description and simultaneous reference to FIGS. 1–5 of the drawings.

FIG. 1 shows in very schematic form a photographic camera 10 which might be employed to form a spectral zonal spatially periodically modulated photographic record. The record may be formed as a composite of three separate color separation exposures of a photosensitive film 12 in the camera 10. The separate color separation records thus formed are respectively associated with a spatial periodic modulation, imposed, for example, by a diffraction grating 16 adjacent the film 12, which is unique in terms of its relative azimuthal orientation.

FIG. 1 depicts the first step of a multi-step operation for forming such a composite record. An object 14, illustrated as having areas of predominantly yellow, green, blue and red spectral reflectance characteristics, as labeled, is photographed through a filter 18 having a spectral transmittance peak in the red region of the visible spectrum. A grating 16 having a line orientation sloping, for example, at 30° to the horizontal, from upper right to lower left (as the grating would appear if viewed from the back of the camera), is juxtaposed with the film 12 to effect a superposition of a shadow image of the grating 16 on the red light image of object 14. The resulting color separation record 19 associated with the red content in the object 14, processed to a positive, for example by reversal processing techniques, would appear as shown in FIG. 2A. The object appears inverted, of course, because of the property of the objective lens of rotating the image 180°. It is seen from FIG. 2A that the grating modulation is superimposed upon the object detail associated with light having a red spectral content. Note that because of the red constituent of yellow light, the yellow area in the object 14 is also imaged with superimposed grating lines of like angular orientation.

To complete the formation of a composite photographic record, as shown in FIG. 2D at 20, color separation exposures are then made successively through a filter having a spectral transmittance characterized by a blue dominant wavelength with a diffraction grating oriented vertically, and then finally through a filter having a spectral transmittance dominant in the green region of the spectrum with a diffraction grating having a grating orientation sloping from the upper left to lower right, for example, at 30° to the horizontal.

It is seen from FIG. 2B that the blue color separation record 21 does not result in the exposure of any part of the film 12 not associated with blue content in the object 14; however, on exposure to the object 14 through a green filter, the yellow area is again exposed with grating image superimposed thereon with an orientation associated with the green color separation record 22. Thus, as shown in FIG. 2D, the object area having yellow spectral content has superimposed thereon spatial periodic modulations associated with both the red and green color separation records.

Apparatus for displaying such a photographic record is known to the prior art and may take the form shown in FIG. 3. Such display apparatus includes a source 23 of at least partially coherent light, herein intended to mean light which is spatially coherent at the film gate over at least a few modulation periods, illustrated as comprising an arc lamp 24, a condenser lens 25 and a mask 26 having an aperture 27 of restricted diameter. A lens 28 is provided for effectively transporting the point light source formed to a far field, either real or virtual. A film gate 29 for supporting a transparency record to be displayed, a transform lens 30 (explained below), a Fourier transformer filter 31 (explained below), a projection lens 32 and a display screen 33 complete the display apparatus.

Upon illumination of a transparency record, such as composite record 20, in film holder 29, there will be produced three angularly displaced multi-order diffraction patterns, collectively designated by reference numeral 34. Each of the component diffraction patterns associated with a particular color separation image contains a zeroth order which is spatially coextensive with the zeroth order (undiffracted) components of each of the other patterns, and a plurality of higher order (diffracted) components each containing the related color object spatial frequency spectrum modulating a carrier having a frequency equal to a multiple of the grating fundamental frequency, the value of the multiple being a function of the diffraction order $m$.

By the use of transform lens 30 these diffraction patterns are formed within the confines of the projection system in a space commonly known as the Fourier transform space. It is thus termed because of the spatial and temporal frequency analysis which is achieved in this plane by diffraction and interference effects. Through the use of spatial and spectral filtering of these patterns in the transform plane, one or more of the discrete color separation images may be displayed. If all three color separation images are retrieved simultaneously, and appropriately spectrally filtered, a reconstitution of the original scene in true color is achieved.

The nature of the Fourier transform space and the effects that may be achieved by spatial filtering alone or by spatial and spectral filtering in this space of a selected diffraction order or orders may be understood by reference to FIG. 4 showing an enlarged frontal view of hypothetical diffraction patterns which might be formed in the transform space of the projection system described above. FIG. 4 shows three angularly separated diffraction patterns corresponding to the red, blue and green light object spatial frequency spectra lying along axes labeled 36, 38, and 40 respectively. Each of the axes 36, 38 and 40 is oriented orthogonally to the periodic modulation on the associated color separation record. The diffraction patterns share a common zeroth order location but have spatially separated higher orders.

By the nature of diffraction phenomena, the diffraction angle $\alpha$ is:

$$\alpha = \lambda \omega$$

where $\lambda$ represents the spectral wavelength of the illumination radiation and $\omega$ represents spatial frequencies. Assuming the light at the film gate 29 to be collimated, the diffraction orders will be formed in the transform space at the delta function positions determined by the transform of the record modulation at radial distances from the pattern axis:

$$R = f_2 m \, _c\overline{\lambda}$$

where $f_2$ is the focal length of lens 30; $\overline{\lambda}$ is the mean wavelength of the illuminating radiation; $m$ represents the diffraction order; and $\omega_c$ is the fundamental grating frequency.

It should be understood that the FIG. 4 illustration of the diffraction patterns which might be formed is a gross simplification. In the interest of clarity and ease of understanding, the delimitation of the various diffraction orders has been represented as being circular. In reality, of course, the orders have no finite outline in transform space. The order boundaries indicated are merely isophotic lines connecting points of like energy level. In the real situation, the shape of the isophotic lines is determined by the light source shape and spectra, the envelopes of the grating elements and the scene or object recorded.

The first orders of each of the diffraction patterns can be considered as being an object spatial frequency spectrum of maximum frequency $\omega_s$ (representing a radius of the order) convolved with a carrier of spatial frequency $\omega_c$. The second order components can be thought of as being the convolution of an object spectrum having a maximum spatial frequency $\omega_s$ with a carrier having a spatial frequency of $2\omega_c$, and so forth. Thus, the various orders of each diffraction pattern may be thought of as being harmonically related, with a spatial frequency $\omega_c$, or an even multiple thereof, acting as a carrier for the spectrum of spatial frequencies characterizing the object detail. Two orders only are shown; however, it should be understood that even higher orders are presents, but will be of increasingly less intensity.

Spatial filtering of the diffraction pattern is achieved by placing the apertured transform filter 31 in the transform space, as shown in FIG. 3. Since the zeroth order components of the diffraction patterns are spatially coextensive, the spatial frequencies contained in the zeroth order information channel represents the sum of the object spectra respectively associated with each of the color separation records, 19, 21 and 22. Thus an opening in the transform filter 31 at the zeroth order location would result in a composite image of object 14 being formed in tones of grey, black and white. Because the information channels associated with each of the color separation records are inseparably commingled in the zeroth order, they can not be properly recolored to effect a faithful color reproduction of the photographed object. However, at the higher orders, because of the angular displacement of the red, blue and green-associated axes 36, 38 and 40, the proper spectral characteristic may be added to each of the information channels by appropriate spectral filtering.

FIG. 5 represents an enlargement of a central portion of filter 31, illustrating appropriate spatial filtering apertures with the correct spectral filters to effect a true color reproduction of the object. It should be understood, of course, that higher order components, appropriately spectrally filtered, could also be passed, if desired. However, to maintain the discussion at a fundamental level, utiiization of only the first order diffraction components has been illustrated.

Consider now a trace of the projection illumination as it traverses the projection system. The lamp 24 and condenser lens 25 are designed to evenly illuminate aperture 27 in mask 26 with a beam of maximum intensity broadband luminous energy. Lens 28 is shown spaced axially from mask 26 a distance substantially equal to its focal length in order that the light illuminating the film gate is substantially collimated. Transform lens 30 collects the substantially planar wave fronts in the zeroth order and diffracted higher orders and brings them to a focus in transform space in the aperture of the projection lens 32. The lenses 28 and 30 may be thus thought of as cooperating to image the illuminated aperture 27 in mask 26 on the transform filter 31.

It is evident that by prior art methods and apparatus, the display of photographic records of the above-described type is hampered by the low levels of image brightness which may be obtained. One of the limitations on image brightness results from the fact that the zeroth order, which is more intense than any of the higher orders, is blocked, only the higher orders being transmitted.

Another very important constraint on the image brightness results from a requirement that the effective source must not exceed a predetermined maximum size to prevent overlap, and thus "cross talk," between the diffraction orders. It is seen that the center of each of the higher orders of a diffraction pattern is spaced radially from the pattern axis by an integral multiple of the carrier frequency $\omega_c$ and that the radius of each of the orders corresponds to spatial frequency $\omega_s$. To prevent overlap between the zeroth and higher orders, $\omega_c$ must be greater than, or at least equal to $2\omega_s$. (This may be thought of as a version of the sampling theoerm.) Since each diffraction order is an image of the illuminated aperture 27 in mask 26 magnified by the ratio $f_2/f_1$, it follows then that the diameter $d$ of the aperture 27 in mask 26, and thus the total light flux transmissable through the aperture 27, is constrained in accordance with the relationship (assuming collimated light at the film 29);

$$d = f_1 \overline{\lambda} \omega_c$$

where $f_1$ represents the focal length of lens 28, and $\overline{\lambda}$ and $\omega_c$ are as indicated above.

The illuminance of the film gate by the collimator is $$E = \frac{Bd^2}{4f_1^2} \pi$$

where B is the source photometric brightness (luminance) in candles/cm.². Substituting for $d$ from above $$E = \frac{\pi B \lambda^2 \omega_c^2}{4}$$

This relation clearly illustrates that an increase in the brightness of displayed images can be obtained by previous techniques only at the cost of increasing the source brightness B or the grating frequency $\omega_c$.

It is the stated object of this invention to provide means for greatly improving the brightness of the displayed image by delivering a much greater amount of light to the film gate and projection lens 32 without sacrificing color saturation. The invention may be best understood in its simplest aspects by reference to FIG. 6 showing schematically a projection display apparatus similar in overall arrangement to that shown in FIG. 3, but modified in accordance with the teachings of this invention. By this invention, rather than having a single source of at least partially coherent light for illuminating the film gate, two, or preferably many more than two, effective sources are provided. Referring now to FIG. 6, apparatus constructed in accordance with this invention may have a projection lamp 54 having an arc 55 providing an intense luminous radiation source of limited size. A spherical reflector 56 for collecting radiation from the arc 55, is rotated slightly about an axis transverse to the system optical axis such that the image 58 of the arc 55 formed by the reflector 56 is disposed spatially separated from the arc 55.

Condensing lens 60 focuses on respective apertures 61 and 62 in mask 63 the images of the arc 55 and its image 58. By this arrangement, a second light source for illuminating the film gate 64 has been created. A field lens 65 may be located substantially at the arc image plane to minimize light losses.

A collimator 66, transform lens 67 and projection lens 68 have a similar function in the FIG. 6 system as did the lenses 28, 30 and 32 in the system of FIG. 3, described above. The radiation from the two effective sources is substantially collimated and directed through a record such as the composite record 20 to form in Fourier transform space two similar but spatially separated, diffraction patterns, 69 and 70. One pattern is associated with each of the effective sources, and each comprises angularly displaced patterns respectively associated with the red, green and blue color separation records of object 14.

By appropriate spatial and spectral filtering with a transform spatial filter 72 so as to pass the first orders of diffraction pattern components associated with each of the effective point sources, the amount of light transmitted through the system to form a display of the composite photographic record 20 is increased by a factor approaching two without introducing any desaturation of the colors in the displayed image. The spatial separation of the two effective sources is not critical, but must exceed a minimum distance necessary to prevent overlapping of the diffraction patterns 69, 70.

For clarity of description and ease in understanding the invention, the FIG. 6 embodiment has been shown as having one additional light source. However, the principles discussed may be extended to include a much larger number of effective light sources. It is desirable, in a preferred embodiment, to provide the maximum number of light sources whose corresponding diffraction patterns will all be passed by the aperture of the projection lens. To this end, an embodiment, illustrated in FIG. 7 has seven light sources distributed about the system optical axis—an axial source and a hexagonal array of sources around the axial source. The FIG. 7 embodiment comprises a projection arc lamp 78 having its arc 79 disposed at the focus of an elliptical reflector 80 focused substantially at a film gate 82. A symmetrical array 83 of lenses collect light from the reflector 80, each of which lenses respectively focus the collected light upon one of a corresponding array of apertures 84 in a mask 85. Field lenses 85a, corresponding in function to field lens 65 in the FIG. 6 embodiment, are provided. A transform lens 86 and a projection lens 87 functioning as in the above-described embodiments, are provided. The FIG. 7 display apparatus is adapted to display a composite record 88, as shown, having modulation vectors associated with the red and green color separation records at 30° to the horizontal and the modulation vector associated with the blue color separation record oriented at 90° to the vertical.

By appropriate geometry of the array of lenses 83, and correspondingly the apertures 84 in mask 85, the seven groups of angularly related diffraction patterns formed, collectively designated 89, can be caused to interlink in such a way that diffraction pattern components in different groups associated with the same color separation record overlap. FIG. 7A is an enlarged schematic illustration of a portion of a composite diffraction pattern which might be formed in transform space by the FIG. 7 apparatus, showing the overlapping of related diffraction orders in different groups of diffraction patterns. Parts of the diffraction patterns produced by four of the effective point sources are shown. The circular areas labeled $S_{1_0}$, $S_{2_0}$, $S_{3_0}$, and $S_{4_0}$ indicate the zeroth orders respectively associated with the four point sources. It is seen from FIG. 7A that the first order diffraction spectra in different groups of patterns carrying the same color separation information are disposed in an overlapping relationship. For example, the first order red information spectra $S_{1R}$ associated with $S_1$ overlaps the red information spectra $S_{2R}$ associated with $S_2$. Similarly, the first order red and blue information spectra in each of the pattern groups overlaps first order spectra of like color information in adjoining pattern groups. The amount of overlap may be varied, the preferred arrangement having the overlapping spectra completely coextensive, rather than partially coextensive, as shown. With the seven source embodiment shown in FIG. 7, the openings in a transform filter 90 can thus be arranged compactly such that each opening passes a spectrally related first order object spectrum of two adjoining diffraction pattern groups, as shown in FIG. 8. Thus, with such an interlinking arrangement of spatial and spectral filters, the number of sources which may be employed, for a given projection aperture, is maximized and the required number of spatial filter apertures and associated spectral filters is minimized.

FIG. 9 illustrates an arrangement of nine light sources in an orthogonal grid which is even more efficient than the FIG. 7 embodiment in utilizing the arc luminious energy to display photographic records of the described type. The FIG. 9 embodiment is illustrated as including an arc lamp 100, for example an Osram XBO 450 watt lamp having a .9 by 2.7 millimeter arc. A high speed condenser lens 102, preferably highly corrected for spherical abberation, is focused at the plane of the image of the photographic transparency record 104 formed by a collimator lens 106 and a transform lens 108. A lenticular array 110 condensing lenses 112, which, for example, may be integrally molded into a single element of a suitable synthetic resin, is focused on a corresponding array of apertures 114 in a mask 116 to form nine effective sources. Field lenses 117, corresponding to lenses 85a in the FIG. 8 embodiment, are preferably provided.

It is evident that the effective relative speeds of the condensing arrangements of the FIG. 7 and FIG. 9 embodiments is much greater than the speed of the prior art (FIG. 3) system employing only one effective point source. The light output which may be realized by a condensing system is an inverse function of the square of the $f$-number—thus, the light output from the condensing system of the FIG. 9 embodiment, which may, for example, have an effective $f$-number of .88 would be approximately six times greater than the output of a single effective source system having, for example, an $f$-number of 2.18. This relative output indication would also, of course, be affected by the relative efficiency of illuminating the mask apertures, the relative reflection losses, and other factors.

A transform filter 118 adapted for use with the FIG. 9 system but with a composite record slightly modified from that illustrated for use with the other embodiments described might appear as shown in FIG. 10. As with the transform filter 90 for the FIG. 7 embodiment (shown enlarged in FIG. 8), the filter 118 has openings for passing spectrally related first order object spectra of different diffraction patterns. It is noted; however, that the geometry of the red, blue and green-associated axes differs from that of the above-described systems. The filter 118 is designed for use with a record 120 as shown in FIG. 11 wherein the direction vector of the periodic modulation associated with the red color separation record is along a 45° axis and the direction vectors of the modulations associated with the blue and green color separation records are oriented along horizontal and vertical axes, respectively.

The filter 118 takes advantage of the fact that the eye is unable to resolve light of all spectral compositions equally well. More specifically, the eye is able to resolve a greater bandwidth of spatial frequencies in light at the low energy (red) end of the spectrum than it is at the high energy (blue) end of the spectrum. Taking advantage of this physiological characteristic of the eye, the filter openings for passing light associated with the red object spectrum are rendered larger (and thus will pass higher spatial frequencies) than those openings designed to pass the object spectrums respectively associated with the green and blue color separation images. The openings are elongated to maximize the passage of both overlapped orders (the overlap is only partial in the illustrated embodiment) and are specially contoured to minimize passage of cross-talk energy from other channels.

The invention is not limited to the particular details of construction of the embodiments depicted, and it is contemplated that various and other modifications and applications will occur to those skilled in the art. For example, other means effective to produce different numbers and geometrical arrangements of effective point sources is contemplated. Because certain changes may be made in the above-described apparatus without departing from the true spirit and scope of the invention herein involved, it is intended that the subject matter of the above depiction be interpreted as illustrative and not in a limiting sense.

What is claimed is:

1. For use with optical apparatus providing a plurality of effectively far-field point sources of at least partially coherent light separated in a predetermined distribution about a system optical axis and resolving in a Fourier transform space a corresponding plurality of discrete diffraction patterns of a spatially periodically modulated record illuminated by said plurality of light sources, spatial filter means for location in said transform space defining a plurality of mated pairs of light-transmissive areas for selectively passing at least a portion of each of a mated pair of first orders of each of said plurality of diffraction patterns, said mated pairs of areas for passing said mated pairs of first orders being irregularly contoured for passage of a maximum bandwidth of spatial frequencies and minimum passage of cross-talk energy.

2. For use with optical apparatus for retrieving color information from a record on which a plural number of color separation images respectively modulate spatial carriers having a predetermined azimuthal separation, the apparatus providing a plurality of effectively far-field point sources of at least partially coherent light separated in a predetermined distribution with respect to a system optical axis and resolving in a Fourier transform space a corresponding plurality of diffraction patterns of said record, each pattern containing a mated pair of first orders for each color separation image, the pairs lying along axes respectively orthogonally related to the orientation of the associated image carrier, spatial filter means for location in said transform space and comprising mask means defining a plurality of discrete groups of light-transmissive areas respectively associated with said plurality of diffraction patterns, each group including a plural number of mated pairs of light-transmissive areas, one pair for each of said color separation images, said pairs of areas transmitting at least a portion of each of said mated pairs of first orders, said light sources and said groups of areas being arranged such that orders associated with different point sources but representing a common color separation image, to the exclusion of all orders representing other color separation images, overlap and pass through common transmissive areas.

3. Filter means as defined by claim 2 wherein said record contains three color separation images modulating three spatial carriers having a 45° azimuthal separation and wherein each of said groups of areas defined by said mask means comprises three mated pairs of light-transmissive areas, said groups of areas being arranged in an interlinked pattern having areas in adjoining groups of areas which represent the same color separation image but which constitute pair opposites overlap.

4. Filter means as defined by claim 3 including a spectral filter registered with each of said component openings, the spectral filters associated with openings passing orders related to a common periodic modulation having the same spectral transmittance characteristic.

5. Filter means as defined by claim 4 wherein the area of each of said component openings, and thus the maximum spatial frequency which may be transmitted, is related to the spectral transmittance characteristic of the spectral filter associated with that opening such that the higher spatial frequencies transmitted by said filter means correspond to information associated with the lower temporal frequencies.

6. The filter means as defined by claim 5 wherein component openings in said groups of openings registered with spectral filters having a common spectral transmittance characteristic are disposed in rectilinear strips.

7. The filter defined by claim 3 wherein record contains blue, red, and green color separation images with the carriers for the blue and green separation images being orthogonally related and the red separation carrier being oriented at 45° relative to each of said blue and green separation carriers, and wherein the area and distance from the zeroth order location for each of said mated pairs of light-transmissive areas in said groups of areas is greater for the areas passing the red color separation image.

8. The filter defined by claim 2 wherein said areas for passing said mated pairs of first orders are irregularly contoured for passing a maximum bandwidth of spatial frequencies and a minimum amount of cross-talk energy.

9. The filter defined by claim 2 wherein said overlapped orders representing a common color separation image are only partially overlapped and wherein said areas are elongated to pass a substantial portion of both of said overlapped orders.

10. The filter defined by claim 2 wherein the area and distance from the zeroth order location for each of said mated pairs of light transmissive areas in said groups of areas is greater for the areas passing the longest wavelength color separation image.

11. In an optical system for retrieving from a photostorage record a plural number of superimposed images respectively modulating spatial carriers having a predetermined azimuthal separation, the combination comprising:
light source means for providing a plurality of effectively far-field point sources of at least partially coherent light separated in a predetermined distribution with respect to a system optical axis;
lens means on said axis for imaging said point sources through said record to form in a Fourier transform space a corresponding plurality of diffraction patterns of said record, each pattern containing a mated pair of first orders for each image, the pairs of orders lying along axes respectively orthogonally related to the orientation of the associated image carrier; and
spatial filter means for location in said transform space and comprising mask means defining a plurality of discrete groups of light-transmissive areas respectively associated with said plurality of diffraction patterns, each group including a plural number of mated pairs of light-transmissive areas, one pair for each of said images, said pairs of areas transmitting at least a portion of each of said mated pairs of first orders, said mated pairs of said areas for passing said mated pairs of first orders being irregularly bounded for maximum bandwidth and minimum cross-talk.

12. In an optical display system for producing full color images from a record which includes a plural number of superimposed color separation images respectively modulating spatial carriers of unique azimuthal orientation, the combination comprising:

light source means for providing a plurality of effectively far-field sources of at least partially coherent light separated in a predetermined distribution with respect to a system optical axis;

lens means for imaging said plurality of sources through said record to form in a Fourier transform space a corresponding plurality of multi-order composite diffraction patterns of a record illuminated by said light sources, each of said composite diffraction patterns comprising a like plural number of coaxial, angularly displaced component diffraction patterns respectively associated with a spatial carrier having a particular azimuthal orientation; and spatial filter means for location in said transform space and comprising mask means defining a plurality of groups of component openings, each group being respectively associated with one of said plurality of composite diffraction patterns, each component opening in each group of openings being located to transmit at least one diffracted order of one of said angularly displaced component patterns, said groups of openings being arranged on said mask means such that only component openings in different groups of openings which respectively pass an order of a component pattern related to the same spatial carrier are caused to overlap.

13. Filter means as defined by claim 12 wherein said color separation images represent blue, red, and green information modulating spatial carriers of like frequency and 0°–45°–90° relative azimuthal orientation, wherein said plurality of point sources are arranged in a generally square grid geometry, and wherein each of said groups of openings defined by said mask means comprises three symmetrical pairs of component openings, said pairs lying along axes having a 0°–45°–90° relative azimuthal orientation said groups of openings being arranged in an interlinked pattern having each component opening pair constituent in each group of openings overlapping the respective opposite pair constituent in an adjoining group of openings.

14. Filter means as defined by claim 13 including a spectral filter registered with each of said component openings, the spectral filters associated with openings passing orders related to a common periodic modulation having the same spectral transmittance characteristic.

15. Filter means as defined by claim 14 wherein the area of each of said component openings, and thus the maximum spatial frequency which may be transmitted, is related to the spectral transmittance characteristic of the spectral filter associated with that opening such that the higher spatial frequencies transmitted by said filter means correspond to information associated with the lower temporal frequencies.

16. The filter means as defined by claim 15 wherein component openings in said groups of openings registered with spectral filters having a common spectral transmittance characteristic are disposed in rectilinear strips.

17. The apparatus defined by claim 12 wherein said light source means for providing said plurality of effectively far-field sources comprises:

an incoherent source of luminous energy,
condensing lens means for collecting light from said incoherent source and converging the light toward a film gate for holding said record;

a substantially opaque member between said condensing lens means and said film gate, said member having a plurality of pinholes arranged in a predetermined geometry on said member, and a plurality of small lenses equal in number to said plurality of pinholes and arranged substantially in a plane between said condensing lens means and said member and parallel to said member, said lenses being arranged in a geometry corresponding to the geometry of said pinholes for respectively focusing light from said condensing lens into said pinholes, said lens means for imaging said light sources through said record collecting light emanating from said pinholes.

18. The apparatus defined by claim 12 wherein said component openings are irregularly contoured for passing a maximum bandwidth of spatial frequencies and a minimum amount of cross-talk energy.

19. A method for retrieving color information from a colorless record on which a plural number of color separation images respectively modulate spatial carriers having a predetermined azimuthal separation, comprising:

illuminating the record with a plurality of effectively far-field point sources of at least partially coherent light;

forming in a Fourier transform space a corresponding plurality of discrete diffraction patterns of the record, each pattern containing a mated pair of first orders for each color separation image, the pairs of orders lying along axes respectively orthogonally related to the orientation of the asociated image carrier;

arranging said plurality of light sources such that first orders representing a common color separation image, to the exclusion of all orders representing other color separation images, will overlap, selectively passing through said transform space at least a portion of said overlapped orders of said diffracted patterns; and forming an image of the record with said light transmitted through said Fourier transform space.

20. The method of claim 19 including spectrally filtering selected information channels to associate the information in said selected channels with predetermined spectral zones.

21. The method of claim 20 including arranging said light sources such that related orders in different diffraction patterns are caused to overlap in said transform space.

22. The method of claim 21 including selectively transmitting through said transform space exclusively said overlapped orders of said diffraction patterns.

23. The method of claim 22 including spectrally filtering said overlapped orders of said diffraction patterns.

24. In an optical system for retrieving from a photostorage record super-imposed blue, red, and green color separation images respectively modulating spatial carriers having a relative 0°–45°–90° azimuthal separation, the combination comprising:

light source means for providing a plurality of effectively far-field point sources of at least partially coherent light separated in a predetermined distribution with respect to a system optical axis;

lens means on said axis for imaging said point sources through said record to form in a Fourier transform space a corresponding plurality of diffraction patterns of said record, each pattern containing a mated pair of first orders for each image, the pairs of orders lying along axes respectively orthogonally related to the orientation of the associated image carrier;

spatial filter means for location in said transform space and comprising mask means defining a plurality of discrete groups of light-transmissive areas respectively associated with said plurality of diffraction patterns, each group including a plural number of mated pairs of light-transmissive areas, one pair for each of said color separation images, said pairs of areas transmitting at least a portion of each of said mated pairs of first orders, said light sources and said groups of areas being arranged such that pair opposite first orders associated with different point sources but representing a common color separation image, to the exclusion of all orders representing other color separation images, overlap and pass through common transmissive areas.

25. The apparatus defined by claim 24 wherein said plurality of point sources are arranged in a generally square grid geometry.

26. The apparatus as defined by claim 21 wherein said mated pairs of areas in each group of areas lie along axes having a relative 0°–45°–90° geometry, said pair of areas lying along said 45° axis passing red color separation information and being of greater area and radial displacement from the zeroth order location than the areas passing blue or green separation information.

27. The apparatus defined by claim 26 including blue, red, and green spectral filters disposed in registration with the said areas in said spatial filter means transmitting exclusively blue, red, and green color separation information, respectively.

28. The apparatus defined by claim 27 wherein said light source means for providing said plurality of effectively far-field sources comprises:
an incoherent source of luminous energy,
condensing lens means for collecting light from said incoherent source and converging the light toward a film gate for holding said record,
a substantially opaque member between said condensing lens means and said film gate, said member having a plurality of pinholes arranged in a square grid geometry on said member, and
a plurality of small lenses equal in number to said plurality of pinholes and arranged substantially in a plane between said condensing lens means and said member and parallel to said member, said lenses being arranged in a square grid geometry corresponding to the geometry of said pinholes for respectively focusing light from said condensing lens into said pinholes,
said lens means for imaging said light sources through said record collecting light emanating from said pinholes.

References Cited

UNITED STATES PATENTS

| | | | |
|---|---|---|---|
| 2,050,417 | 8/1936 | Bocca | 350—162SF |
| 2,813,146 | 11/1957 | Glenn | 350—162SF |
| 2,995,067 | 8/1961 | Glenn | 350—162SF |
| 3,045,531 | 7/1962 | Prescott | 350—162 |
| 3,314,052 | 4/1967 | Lohmann | 350—162X |
| 3,078,338 | 2/1963 | Glenn | 350—161X |
| 3,330,908 | 7/1967 | Good et al. | 350—161X |

JOHN K. CORBIN, Primary Examiner

U.S. Cl. X.R.

350—167, 206; 353—97